United States Patent
Sannokyou (10) Patent No.: US 10,481,303 B2
(45) Date of Patent: Nov. 19, 2019

(54) LENS ARRAY, LENS ARRAY LAMINATE BODY, LENS ARRAY MANUFACTURING METHOD, LENS ARRAY LAMINATE BODY MANUFACTURING METHOD, AND LENS UNIT MANUFACTURING METHOD

(71) Applicant: KONICA MINOLTA, INC., Chiyoda-ku (JP)

(72) Inventor: Takashi Sannokyou, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 466 days.

(21) Appl. No.: 14/428,317

(22) PCT Filed: Sep. 5, 2013

(86) PCT No.: PCT/JP2013/073905
§ 371 (c)(1),
(2) Date: Mar. 13, 2015

(87) PCT Pub. No.: WO2014/042060
PCT Pub. Date: Mar. 20, 2014

(65) Prior Publication Data
US 2015/0247959 A1 Sep. 3, 2015

(30) Foreign Application Priority Data
Sep. 15, 2012 (JP) .................... 2012-203741

(51) Int. Cl.
*G02B 3/00* (2006.01)
*C03B 11/08* (2006.01)
*C03C 27/06* (2006.01)

(52) U.S. Cl.
CPC .............. *G02B 3/005* (2013.01); *C03B 11/08* (2013.01); *C03C 27/06* (2013.01); *G02B 3/0031* (2013.01);
(Continued)

(58) Field of Classification Search
CPC .... G02B 3/005; G02B 3/0056; G02B 3/0031; C03B 11/08; C03B 11/082;
(Continued)

(56) References Cited

U.S. PATENT DOCUMENTS

| 2012/0300320 A1* | 11/2012 | Matsuda | C03B 11/082 359/811 |
| 2013/0194676 A1* | 8/2013 | Sannokyou | C03B 11/08 359/642 |
| 2014/0147633 A1* | 5/2014 | Ashida | G02B 3/00 428/156 |

FOREIGN PATENT DOCUMENTS

| CN | 1320374 | 6/2007 |
| JP | 2001-48554 | 2/2001 |

(Continued)

*Primary Examiner* — William R Alexander
*Assistant Examiner* — Gary W O'Neill
(74) *Attorney, Agent, or Firm* — Cozen O'Connor (57) ABSTRACT

A convex fitting portion 30 is provided on a center side to protrude from a support portion 20, and thus, in an assembling process of joining the lens array 100 to another lens array and the like, the lens array 100 can be precisely positioned by being supported from behind. Furthermore, a fitting portion transfer surface 83c forming the convex fitting portion 30 forms a concave portion on the center side of a die at the time of molding of the lens array 100, and thus a volume of a glass droplet, that is, heat capacity is increased, which is advantageous from a viewpoint of making molding of the optical surfaces 11a and 12a stable and highly precise, and the problems such as breakage are less likely to occur.

15 Claims, 7 Drawing Sheets

(52) U.S. Cl.
    CPC .... *C03B 2215/414* (2013.01); *C03B 2215/80* (2013.01)

(58) Field of Classification Search
    CPC ............ C03B 2215/50; C03B 2215/80; C03B 2215/414; C03C 27/06
    USPC ........................................................ 359/619
    See application file for complete search history.

(56) References Cited

FOREIGN PATENT DOCUMENTS

| | | |
|---|---|---|
| JP | 2003-329808 | 11/2003 |
| JP | 2005-200241 | 7/2005 |
| JP | 2006-256906 | 9/2006 |
| JP | 2009-279790 | 12/2009 |
| WO | WO2011093502 A1 * | 4/2011 |
| WO | WO 2011/105201 | 9/2011 |
| WO | WO 2012/043191 | 4/2012 |

* cited by examiner

LENS ARRAY, LENS ARRAY LAMINATE BODY, LENS ARRAY MANUFACTURING METHOD, LENS ARRAY LAMINATE BODY MANUFACTURING METHOD, AND LENS UNIT MANUFACTURING METHOD

RELATED APPLICATIONS

This is a U.S. National Phase Application under 35 USC 371 of International Application PCT/JP2013/073905 filed on Sep. 5, 2013.

This application claims the priority of Japanese application no. 2012-203741 filed Sep. 15, 2012, the entire content of which is hereby incorporated by reference.

TECHNICAL FIELD

The present invention relates to a lens array formed by a glass mold method, a lens array laminate body obtained by laminating the lens arrays, a lens array manufacturing method, a lens array laminate body manufacturing method, and a lens unit manufacturing method.

BACKGROUND ART

A camera is mounted on a mobile phone or any other portable terminals, and cost reduction of an image pickup lens attached to the camera is being required. In order to satisfy such a request, only a review of each process on the basis of an existing manufacturing method has limitation, and the increase in efficiency through a series of process design is required. Furthermore, thickness reduction is required as a market trend, and a request for thickness reduction of a lens which is a component to be mounted thereon is inevitably increasing. A method for satisfying such a request is considered to include a method of forming a lens array made of glass through pressing to thereby be divided into individual lenses, and is considered to be advantageous in that a large number of small-sized glass lenses can be produced with relatively high accuracy at one time.

As a manufacturing method of a lens array made of glass, a glass mold method is known. Here, the glass mold method refers to a method of obtaining an optical element such as a lens as an integral product made of glass by pressing heated and softened glass on a transfer surface of a pair of molding die and by cooling it. As a manufacturing method of a lens array by such a glass mold method, a method of press-molding glass in which a top of an outer-edge flange portion is formed on an outside of a thin flange portion adjacent to an optical fictional surface so that the top of the outer-edge flange portion becomes slightly higher than the top of the optical functional surface and in which a projection portion for preventing inflow of an adhesive into the optical functional surface is formed on the outer-edge flange portion is known (Patent Literature 1). A die used in this method includes a core for molding the optical functional surface and the flange portion and is obtained by subjecting a tip end of a core fitting hole to which the core is fitted to inclination machining, and thus the projection portion is formed on the outer-edge flange portion by transferring a shape of a groove portion formed by the inclination machining.

As another manufacturing method of a lens array made of glass, a method of molding a lens sheet having a large difference between a thickness of a lens portion and a thickness of an edge portion by re-heating a glass material machined into a plate shape by a die is known (Patent Literature 2). In this method, a lens sheet in which the lenses are aligned in a lattice shape is manufactured by using a die in which a glass-material reservoir portion that is a semi-spherical dent is provided at a center part, by sandwiching a glass material sheet between the dies, and by softening and pressing the glass material sheet through heating. The lens sheet molded as described above is divided into individual pieces by being cut to thereby give a glass lens.

As another manufacturing method of a lens array made of glass, a method of molding a thin-plate shaped micro lens array by heating and softening glass preform is known (Patent Literature 3). In this method, a concave portion referred to as a nest cavity is provided close to a center in a die, the preform is arranged in this concave portion, and a gas is discharged from a lens cavity in the die as the glass flows out toward the outside from the center when being pressed and thus the micro lens array having provided a lens portion with an accurate surface shape can be formed. The micro lens array molded as described above is divided into individual pieces by being cut to thereby give a micro lens made of glass.

However, positioning when the lens array is fixed to another component (another lens array, for example) is not easy in the case of using the lens array obtained by Patent Literature 1. In Patent Literature 1, the outer-edge flange portion is provided in order to adjust an interval between facing lenses, but an alignment function relating to a direction perpendicular to an optical axis cannot be expected. That is, the projection portion provided on the outer-edge flange portion is not easily formed with accuracy since glass is forced to enter a gap having a wedge-shaped section provided between the core and the core fitting hole, and two lens arrays cannot be precisely positioned even by using this projection portion.

Furthermore, the lens arrays obtained by Patent Literatures 2 and 3 cannot be easily positioned when the lens array is fixed to another component (for example, another lens array). The glass-material reservoir portion is provided in Patent Literature 2 and the nest cavity is provided in Patent Literature 3, but a function of mutually aligning the arrays in these convex shapes cannot be found.

In addition, as to the lens array made of glass, a molding area becomes large since a large number of lenses are molded at one time, and condition modification such as increase in a molding pressure is required at the time of molding. Therefore, risks such as lens breakage, lens warpage, damage to a die, glass adhesion (occurrence of fusion) become higher. Particularly, although a droplet molding method of a type in which a glass droplet is received by a die and is pressed enables rapid and precise pressing, problems such as lens breakage, lens warpage and the like as described above become easily apparent along with a size increase in the lens array.

CITATION LIST

Patent Literature

PTL 1: Japanese Patent Laid-Open No. 2005-200241
PTL 2: Japanese Patent Laid-Open No. 2006-256906
PTL 3: Japanese Patent Laid-Open No. 2001-48554

SUMMARY OF INVENTION

The present invention has an object to provide a lens array which can be easily positioned when the lens array is to be fixed to another component and with which problems such as lens breakage can hardly occur during manufacturing.

Furthermore, the present invention has an object to provide a lens array laminate body obtained by laminating the lens arrays, a lens array manufacturing method, a lens array laminate body manufacturing method, and a lens unit manufacturing method.

In order to achieve the above-described objects, a lens array according to the present invention includes: a plurality of lens portions; a support portion for supporting the plurality of lens portions in a state of being two-dimensionally aligned; a reference surface for joining provided at the support portion; and a convex fitting portion which is provided between or among the plurality of lens portions on a side opposite to the reference surface to protrude from the support portion and which enables positioning with respect to a holding device. Note that the fitting portion requires shape accuracy corresponding to positioning accuracy from a viewpoint of its use for positioning. Furthermore, since the fitting portion is located on an outer side of the lens portion and is not a portion having an optical function, the fitting portion can be removed so as not to remain in an end product.

According to the above-described lens array, since the convex fitting portion is provided on a center side surrounded by the plurality of lens portions on the side opposite to the reference surface for joining provided at the support portion to protrude from the support portion, it becomes possible to precisely position the lens array by supporting it from behind in an assembling process of joining the lens array. That is, it is possible to position the lens array to the holding device used for assembling for joining the lens array to another component, by the convex fitting portion, and thus positioning when the lens array supported by the holding device is fixed to another component is made simple and accurate. Furthermore, since a transfer surface forming the convex fitting portion forms a concave portion on the center side of the die at the time of molding the lens array, a volume of a glass droplet, that is, heat capacity is increased, which is advantageous from a viewpoint of making molding of an optical surface stable and highly precise and problems such as breakage and warpage are less likely to occur.

In a specific mode or aspect of the present invention, in the above-described lens array, the fitting portion has a flat portion extending in a direction perpendicular to the optical axis of the lens portion and an inclined surface portion formed around the flat portion and inclined with respect to the optical axis of the lens portion. In this case, positioning in an optical axis direction and in the direction perpendicular to the optical axis becomes easy by the inclined surface portion. Note that the positioning in the optical axis direction can also be made easy by the flat portion.

In another aspect of the present invention, a height of the fitting portion in a direction of the optical axis of the lens portion is larger than that of the lens portion. In this case, in handling of the lens array, such as placing it on a base and laminating or stacking it to thereby perform conveyance, storage and the like, the fitting portion has a function of protecting the lens portion. Furthermore, since the volume of the fitting portion is increased, an effect of increasing a volume of the glass droplet, that is, the heat capacity thereof supplied between the dies can be increased.

In still another aspect of the present invention, the plurality of lens portions is arranged on lattice points, and the fitting portion has a circular contour. In this case, the plurality of lens portions can be simply cut out from the lens array by linear dicing. Moreover, by forming the fitting portion in a circular shape, particularly in the case of a glass droplet, the glass droplet uniformly and easily spreads from a center part on a corresponding transfer surface of the die, the transfer surface corresponding to the lens portion can be sufficiently filled while the generation of air bubbles is prevented, and the problems such as lens breakage are less likely to occur.

In still another aspect of the present invention, the support portion has a polygonal (preferably a polygon of a quadrangle or more) contour. In this case, management of rotating posture around an axis of the lens array becomes easy. Note that when the support portion has an octagonal contour, it becomes easy to prevent an increase of a volume of the support portion and to ensure relatively uniform spread of the glass droplet.

In still another aspect of the present invention, a relatively thick protruding portion protruding toward the outside from at least a part of the contour of the support portion is further included. In this case, a margin for an amount of the glass droplet or fluctuation of the spread can be ensured by the protruding portion.

In still another aspect of the present invention, the protruding portion has a plurality of flat portions extending in the direction perpendicular to the optical axis of the lens portion and a plurality of inclined surface portions formed inside the plurality of flat portions and inclined with respect to the optical axis of the lens portion. In this case, positioning of the lens array with respect to the optical axis direction and the direction perpendicular to the optical axis becomes possible by the inclined surface portion. The positioning in the optical direction can also be performed by the flat portion.

In still another aspect of the present invention, a height of the protruding portion in the optical axis direction of the lens portion is larger than the height of the fitting portion. In this case, in handling of the lens array, the protruding portion has a function of protecting the lens portion and the fitting portion.

In still another aspect of the present invention, the entirety is formed of glass. The present invention is suitable for press molding of glass.

In still another aspect of the present invention, the lens array is formed by receiving a droplet obtained by melting glass in a die and performing pressing. The lens array of the present invention can be easily positioned when being manufactured by a droplet molding method, and an effect of suppressing occurrence of the problems such as lens breakage is enhanced.

In still another aspect of the present invention, distances from a center of the fitting portion to centers of the plurality of lens portions are equal to one another. In this case, by dropping a droplet to the center of the fitting portion, the lens portion is molded in a relatively proximate temperature environment, and an effect of suppressing fluctuation in molding accuracy is high.

In still another aspect of the present invention, a ratio of the volume of the fitting portion to the total volume of the plurality of lens portions is 0.8 or more and 1.2 or less.

In still another aspect of the present invention, a ratio of an area in a plan view of the support portion to an area in a plan view of the support portion except a portion corresponding to the fitting portion is 1.2 or more and 1.5 or less.

The lens array laminate body according to the present invention includes the above-described lens array as a first lens array and a second lens array, and is formed by joining a reference surface of the first lens array to the second lens array.

In the lens array manufacturing method according to the present invention, a lens array is molded by interposing a lens array material between a first die and a second die and by transferring shapes of the first and second optical portion transfer surfaces, the first and second support portion transfer surfaces, and the fitting portion transfer surface: the first die including a plurality of first optical portion transfer surfaces corresponding to first optical surfaces of a plurality of lens portions, a first support portion transfer surface corresponding to a first surface of a support portion for supporting the plurality of lens portions in a state of being two-dimensionally aligned, and a fitting portion transfer surface corresponding to a convex fitting portion which is provided between the plurality of lens portions on a side opposite to a reference surface for joining which is provided at the support portion to protrude from the support portion and which enables positioning with respect to a holding device; and the second die including a plurality of second optical portion transfer surfaces corresponding to the second optical surfaces of the plurality of lens portions and a second support portion transfer surface corresponding to a second surface of the support portion.

According to the above-described lens array manufacturing method, a lens array having the convex fitting portion protruding from the support portion can be molded by the fitting portion transfer surface. As a result, the lens array capable of simple and accurate positioning when the lens array supported by the holding device is fixed to another component can be obtained. Furthermore, since the fitting portion transfer surface has a concave shape, the volume of the glass droplet, that is, the heat capacity is increased, which is advantageous from a viewpoint of making molding of the optical surface stable and highly precise, and the lens array in which problems such as breakage and warpag are less likely to occur can be obtained.

In still another aspect of the present invention, in the above-described lens array manufacturing method, after the lens array material is supplied to the first die, the lens array is molded by pressing the second die onto the first die.

In the lens array laminate body manufacturing method according to the present invention, the lens array laminate body is obtained by joining a reference surface of the above-described lens array as the first lens array to the second lens array.

In the lens unit manufacturing method according to the present invention, the lens array laminate body manufactured by the above-described lens array laminate body manufacturing method divided into individual pieces by being cut in an axial direction.

BRIEF DESCRIPTION OF DRAWINGS

FIG. 2 is a side enlarged cross-sectional view for explaining a fitting portion of the lens array, and the like.

DESCRIPTION OF EMBODIMENTS

Figure 1A:
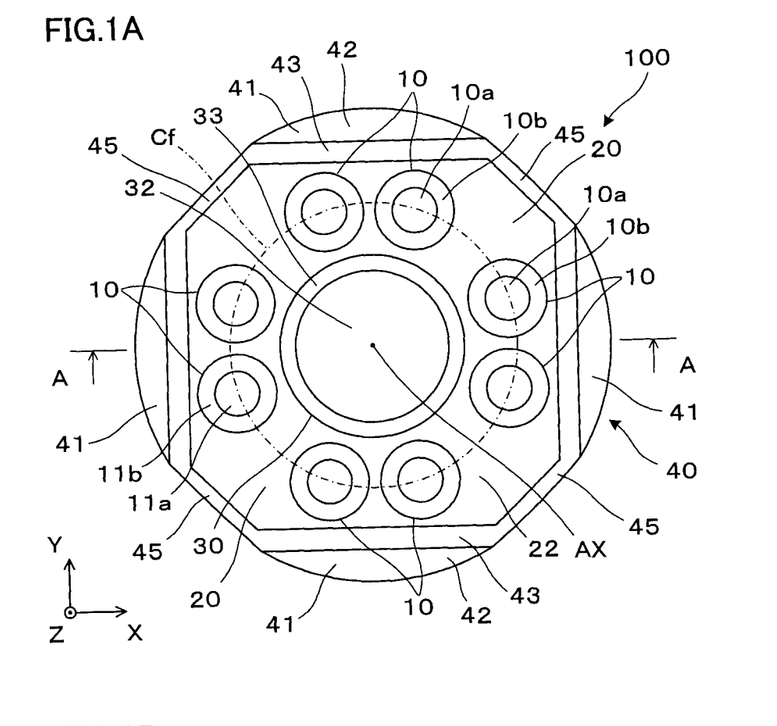
FIG. 1A is a plan view of a lens array.
Figure 1B:
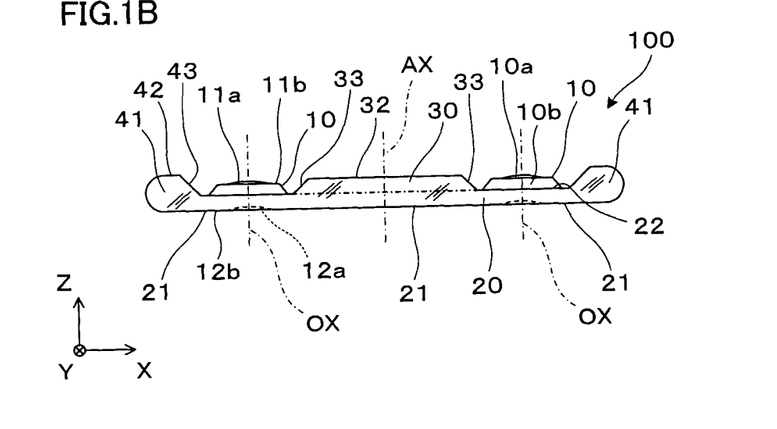
FIG. 1B is an AA arrow cross-sectional view of FIG. 1A.

As illustrated in FIGS. 1A and 1B, a lens array 100 that is an embodiment of the present invention has a flat plate shape as a whole and a contour shape close to a circle in a plan view from a Z-direction. The lens array 100 is totally formed of glass and includes a plurality of lens portions 10, a thin support portion 20 for supporting the plurality of lens portions 10 in a state of being two-dimensionally aligned, a convex fitting portion 30 provided on a center side of the support portion 20 and projecting to one side of the support portion 20, and an protruding portion 40 protruding outward from the contour of the support portion 20.

The eight lens portions 10 constituting the lens array 100 are arranged on square lattice points and arranged at positions with an equal distance from an axis AX passing through the center of the lens array 100, that is, on a circumference Cf around the axis AX. In other words, the distance from the center of the fitting portion 30 (axis AX) to the center of each of the lens portions 10 (optical axis OX) is equal. Each of the lens portions 10 includes a circular center portion 10a having an optical function and an annular outer peripheral portion 10b extending in an outer diameter direction from the center portion 10a. A pair of first and second optical surfaces 11a and 12a constituting the lens portion 10 is spherical surfaces or aspherical surfaces and has curvatures different from each other. In the illustrated example, the first optical surface 11a on an upper side is convex, whereas the second optical surface 12a on a lower side is concave. A pair of first and second outer peripheral surfaces 11b and 12b constituting the outer peripheral portion 10b is formed of a flat surface and an inclined surface, for example, but may be formed only of flat surfaces or only of inclined surfaces or may be formed of curves surfaces. Note that an optical axis OX of each of the lens portions 10 extends in parallel with the axis AX of the lens array 100, that is, the Z-axis.

The support portion 20 extends so as to connect the eight lens portions 10 to each other and has an octagonal contour shape in a plan view. Here, the octagonal shape of the support portion 20 is not a regular octagon but a non-regular octagon, in consideration of convenience of supply of glass to the lens portions 10 and a side in an oblique direction in the middle of the X-axis and the Y-axis is relatively short. The support portion 20 has a uniform thickness and becomes a thinnest portion in the lens array 100. The flat surface in the support portion 20, arranged on the lower side in FIG. 1B is perpendicular to the axis AX and is a reference surface 21 (second surface) in joining of the lens array 100 to another member. A flat surface 22 (first surface) in the support portion 20, arranged on the upper side in FIG. 1B does not have a special role in the present embodiment but can be an additional reference surface in joining or the like of the lens array 100 to another member.

The fitting portion 30 is a portion protruding from the support portion 20, having a circular shape in a plan view and forms a thick portion as compared with the support portion 20 by protruding from the support portion 20 to a one-surface side (also referred to as a back side for convenience) of the lens array 100. The fitting portion 30 has a trapezoidal cross-section and has a flat portion 32 extending in a direction perpendicular to the axis AX (optical axis OX) and an inclined surface portion 33 formed around the flat portion 32 and inclined to the axis AX (optical axis OX). The fitting portion 30 has a positional relation with each of the lens portions 10 regulated accurately, as will be described later. Furthermore, the shape of the inclined surface portion 33 is formed with high accuracy. As a result, accurate positioning of the lens array 100 with respect to the holding device is enabled in supporting the lens array 100 from the back side by a holding device, which will be described later, used for assembling.

The protruding portion 40 has four bow-shaped portions 41 and these bow-shaped portions 41 are thicker than the support portion 20 and extend along major four sides of the support portion 20. Each of the bow-shaped portions 41 has an asymmetric trapezoidal cross-section and has a flat portion 42 extending in a direction perpendicular to the axis AX (optical axis OX) and an inclined surface portion 43 extending to the fitting portion 30 side of the flat portion 42 and inclined to the axis AX (optical axis OX). The protruding portion 40 also enables positioning with respect to the holding device (not shown) used for assembling. Note that the protruding portion 40 has a linear portion 45 inclined with respect to the axis AX and connecting a pair of adjacent bow-shaped portions 41. Both ends of the linear portion 45 are connected so as to be continuous with an end portion of the inclined surface portion 43 of the bow-shaped portion 41.

Figure 2:
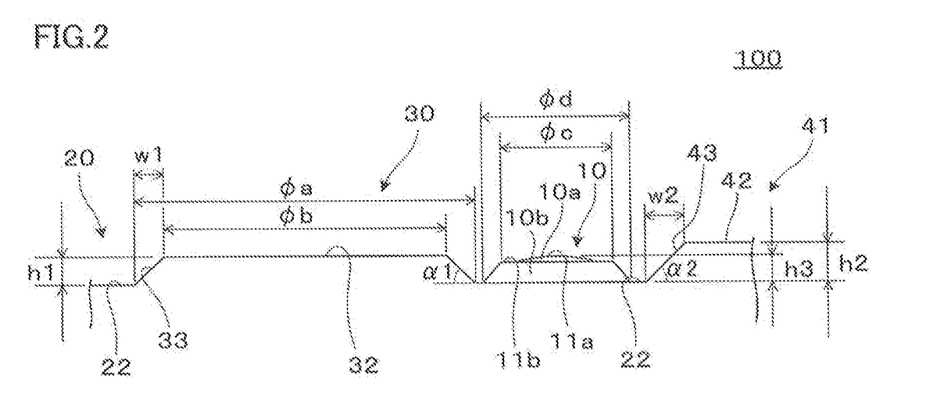

FIG. 2 is a partially enlarged cross-sectional view for explaining a shape of the lens array 100. A shape of the convex fitting portion 30 formed on the lens array 100 has a height h1=0.5 mm in the axis AX direction, a bottom portion diameter $\phi a$=6.2 mm, and a top portion diameter $\phi b$=5.2 mm in the specific example. In addition, a lateral width w1 of the inclined surface portion 33 is 0.5 mm and its inclination angle $\alpha 1$ is 45°. A volume of the fitting portion 30 (specifically, a volume of a portion above the flat surface 22 forming a boundary surface with the support portion 20) is approximately 12.8 mm$^3$.

A shape of the protruding portion 40 has a height h2=0.65 mm in the axis AX direction, a lateral width w2 of the inclined surface portion 43 is 0.65 mm and its inclination angle $\alpha 2$ is 45°, in the specific example.

A shape of the lens portion 10 is appropriately set depending on the intended lens design and has a height h3=0.45 mm in the axis AX direction, a diameter $\phi c$=1.8 mm on an upper end side, and a diameter $\phi d$=2.8 mm on a bottom surface side, in the specific example. An inclination angle of an inclined surface of the outer peripheral portion 10b is, for example, 60°.

In the specific embodiment, an area of the octagonal support portion 20 is 149.9 mm$^2$, an area of the fitting portion 30 is 30.2 mm$^2$, and an area of each of the lens portions 10 is 6.2 mm$^2$, when viewed from the axis AX direction, respectively. Therefore, a ratio between an area s1 where a portion corresponding to the fitting portion 30 in the support portion 20 is hollowed out and an area s0 of the support portion 20 is 0.80. Furthermore, a volume of the fitting portion 30 is 12.8 mm$^3$ and a volume of each of the lens portions 10 (specifically, a volume of a portion above the flat surface 22 forming a boundary surface from the support portion 20) is 1.9 mm$^3$ (a volume of the total lens portions 10 is 15.2 mm$^3$), and thus a volume ratio obtained by dividing the volume of the fitting portion 30 by the total volume of the eight lens portions 10 is approximately 0.84. Moreover, a volume ratio obtained by dividing the volume of the fitting portion 30 by the total volume of the lens array 100 is approximately 0.07.

Size relationships and ranges of dimensions, area and the like are summarized as follows: the height h1 of the fitting portion 30 in the axis AX (optical axis OX) direction is larger than the height h3 of the lens portion 10. Furthermore, the height h2 of the protruding portion 40 in the axis AX (optical axis OX) direction is not smaller than the height h1 of the fitting portion 30. In addition, a ratio of the volume of the fitting portion 30 to the total volume of the eight lens portions 10 is within a range of 0.8 to 1.2. A ratio of the area s0 of the support portion 20 to the area s1 where the portion corresponding to the fitting portion 30 in the support portion 20 is hollowed out is 1.2 or more and 1.5 or less.

Figure 3:
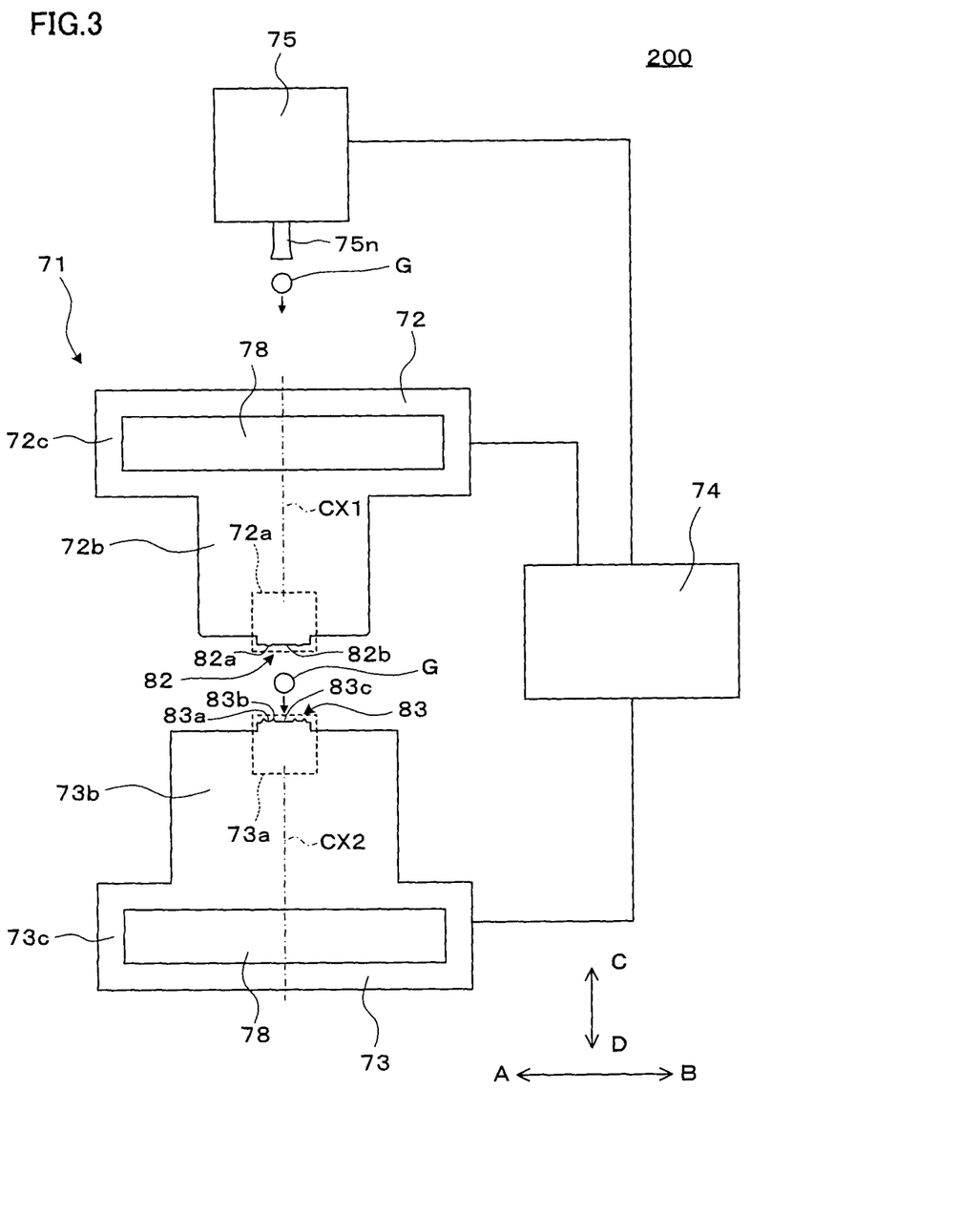
FIG. 3 is a view for explaining a molding device used for a lens array manufacturing method according to an embodiment of the present invention.

FIG. 3 is a view for explaining a molding device 200 for manufacturing the lens array 100 illustrated in FIG. 1A and the like by the droplet molding method. The molding device 200 illustrated is a device for pressure molding for melting and directly pressing glass which is a raw material and incorporates a molding die 71. The molding device 200 further includes a control driving device 74 for allowing the molding die 71 to move or to perform opening/closing operation and the like in manufacturing of the lens array 100 exemplified in FIG. 1A, a glass droplet forming device 75 and the like, in addition to the molding die 71 that is a major member.

The molding die 71 includes a movable-side upper die 72 and a fixed-side lower die 73. In performing molding, the lower die 73 is maintained in a fixed state, whereas the upper die 72 is moved so as to face the lower die 73, and mold closing is performed so that the both dies 72 and 73 are made to abut on each other.

First, the lower die 73 will be described. The lower die 73 includes a die body 73a, a holding portion 73b, and a heater portion 73c. The die body 73a in the lower die 73 has a die surface 83 at an upper end thereof. This die surface 83 has a plurality of optical portion transfer surfaces 83a and the like as transfer surfaces in molding. The heater portion 73c provided at a root of the holding portion 73b of the lower die 73 incorporates an electric heater 78 for appropriately heating the die body 73a.

Figure 4A:
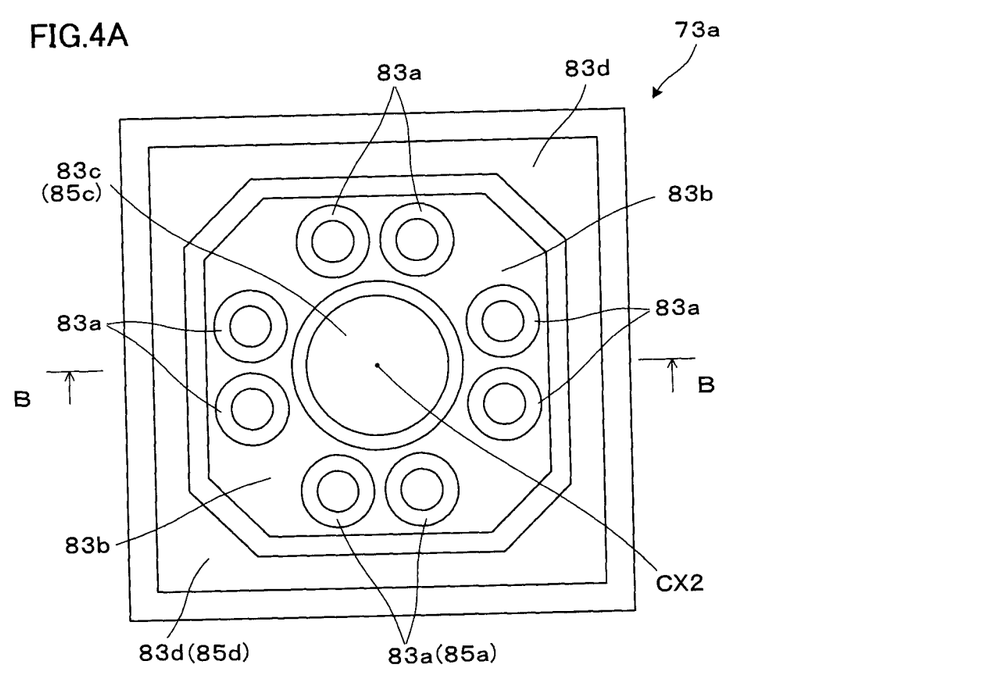
FIG. 4A is an end surface view of a lower die in a molding die.
Figure 4B:
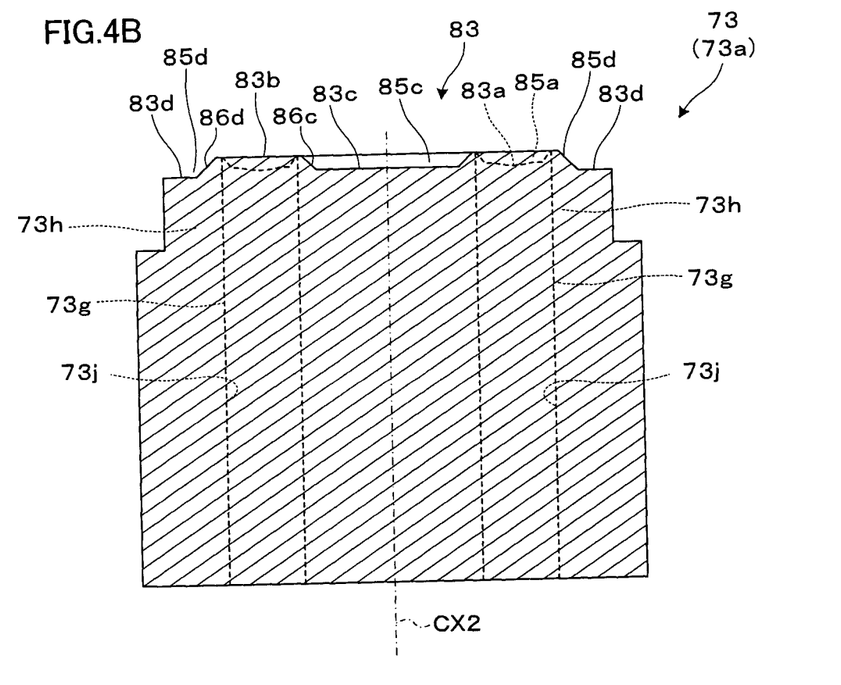
FIG. 4B is a BB arrow cross-sectional view of FIG. 4A.

FIGS. 4A and 4B are an end surface view and a cross-sectional view for explaining the die body 73a of the lower die 73 in an enlarged manner. The die surface 83 of the die body 73a has a plurality of first optical portion transfer surfaces 83a, a first support portion transfer surface 83b, a fitting portion transfer surface 83c, and an outer-edge transfer surface 83d. These transfer surfaces 83a, 83b, 83c, and 83d are for forming a front-side surface of the lens array 100 illustrated in FIG. 1A and are surfaces for forming the plurality of lens portions 10, the support portion 20, the fitting portion 30, and the protruding portion 40, respectively. That is, the first optical portion transfer surface 83a has a concave shape obtained by inverting the first optical surface 11a and the first outer peripheral surface 11b of the lens portion 10, the first support portion transfer surface 83b has a flat shape obtained by inverting the flat surface 22 (first surface) of the support portion 20, the fitting portion transfer surface 83c has a concave shape obtained by inverting the flat portion 32 and the inclined surface portion 33 of the fitting portion 30, and the outer-edge transfer surface 83d has a concave shape obtained by inverting the flat portion 42 and the inclined surface portion 43 of the protruding portion 40. Here, the positional relationship between the first optical portion transfer surface 83a and the fitting portion transfer surface 83c is accurately defined. Furthermore, the first optical portion transfer surface 83a and the fitting portion transfer surface 83c are processed with high accuracy. Note that the die body 73a includes a plurality of shaft-shaped core dies 73g and barrel dies 73h accommodating them. The core die 73g is inserted into and fixed to a core hole 73j formed in the barrel die 73h. The core die 73g forms the first optical portion transfer surface 83a, and the barrel die 73h forms the first support portion transfer surface 83b, the fitting portion transfer surface 83c, and the outer-edge transfer surface 83d.

Figure 5:
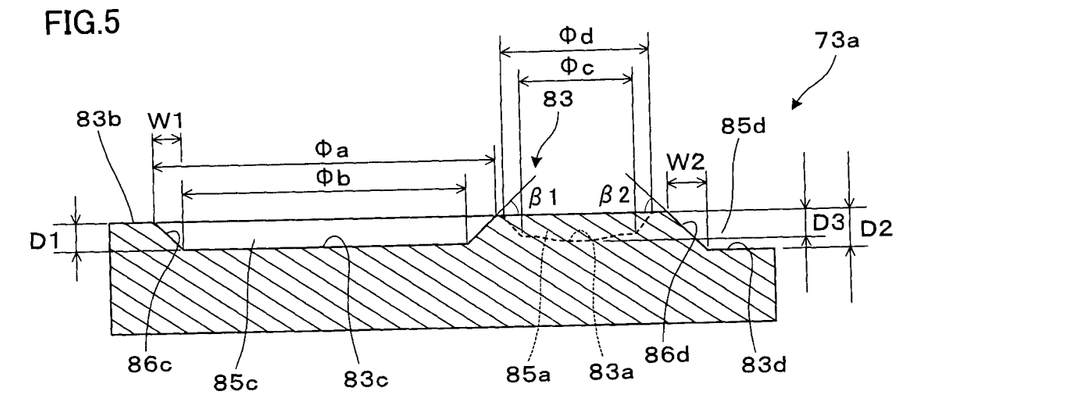
FIG. 5 is a side enlarged cross-sectional view for explaining a concave portion for molding the fitting portion and the like in the lower die.

FIG. 5 is a partially enlarged cross-sectional view for explaining the shape of the lower die 73. A shape of a concave portion 85c of the fitting portion transfer surface 83c has a depth D1=0.5 mm in the axis CX2 direction, an upper end diameter φa=6.2 mm, and a bottom portion diameter φb=5.2 mm in the specific example. In addition, a lateral width W1 of an inclined surface portion 86c of the concave portion 85c is 0.5 mm, and its inclination angle β1 is 45°.

A shape of a concave portion 85d of the outer-edge transfer surface 83d has a depth D2=0.65 mm in the axis AX direction, a lateral width W2 of an inclined surface portion 86d of the concave portion 85d is 0.65 mm, and its inclination angle β2 is 45° in the specific example.

Note that a shape of a concave portion 85a of the first optical portion transfer surface 83a has a height D3=0.45 mm in the axis AX direction, a bottom portion side diameter φc is 1.8 mm, and an upper end diameter φd is 2.8 mm in the specific example.

Returning to FIG. 3, the upper die 72 will be described. As illustrated, the upper die 72 includes a die body 72a, a holding portion 72b, and a heater portion 72c. The die body 72a in the upper die 72 has a die surface 82 at a lower end thereof. This die surface 82 has a plurality of second optical portion transfer surfaces 82a and a plurality of second support portion transfer surfaces 82b as transfer surfaces in molding. The heater portion 72c provided at a root of the holding portion 72b of the upper die 72 incorporates the electric heater 78 for heating the die body 72a as appropriate.

The die surface 82 is for forming a back-side surface of the lens array 100 illustrated in FIG. 1B and is a surface for forming the plurality of lens portions 10 and the support portion 20, respectively. That is, the second optical portion transfer surface 82a in the die surface 82 is for forming the second optical surface 12a and the second outer peripheral surface 12b of the lens portion 10 and has a shape obtained by inverting them. The second support portion transfer surface 82b is for forming the flat reference surface 21 (second surface) for joining the support portion 20 and has an inverted flat shape thereof.

In the upper die 72 and the lower die 73, the die surface 82 of the upper die 72 and the die surface 83 of the lower die 73 are arranged coaxially at the time of pressure molding and maintain an appropriate positional relationship by being separated from each other only at a predetermined interval at the time of pressing and cooling and the like.

The control driving device 74 performs control of power supply to the electric heater 78 and control of the entire molding device 200 incorporating the molding die 71, such as an opening/closing operation of the upper die 72 and the lower die 73 for molding of the lens array 100 by the molding die 71. Note that the upper die 72 driven by the control driving device 74 is movable in a horizontal AB direction as illustrated in FIG. 3 and also movable in a vertical CD direction. In performing die closing by positioning the both dies 72 and 73 in line, for example, first, the upper die 72 is moved to a position above the lower die 73, axes CX1 and CX2 of the both dies 72 and 73 are aligned with each other, and then, the optical portion transfer surface 82a on the upper side and the optical portion transfer surface 83a on the lower side are caused to face each other, and the upper die 72 is lowered and pressed to the lower die 73 side by a predetermined force.

Although detailed description of the glass droplet forming device 75 will be omitted, a molten glass as a lens array material obtained by being molten in a crucible, not shown, is stored, and the glass droplet is intermittently dripped from a nozzle 75n provided in the crucible and dropped onto the die surface 83 of the lower die 73.

Hereinafter, a method of manufacturing the lens array 100 in FIG. 1A by using the molding device 200 in FIG. 3 will be described.

First, the lower die 73 is arranged below the glass droplet forming device 75, and molten glass G as a droplet obtained by melting glass is dripped from the nozzle 75n onto the die surface 83 of the lower die 73 (dripping process). For example, phosphate based glass and the like can be used as the glass which is a raw material used for the molten glass G. The molten glass G spreads on the die surface 83 by its drop speed and own weight. That is, the molten glass G first fills the concave portion 85c illustrated in FIG. 4B, overflows from this concave portion 85c and fills the concave portion 85a arranged in a distributed manner in the periphery.

Figure 6:
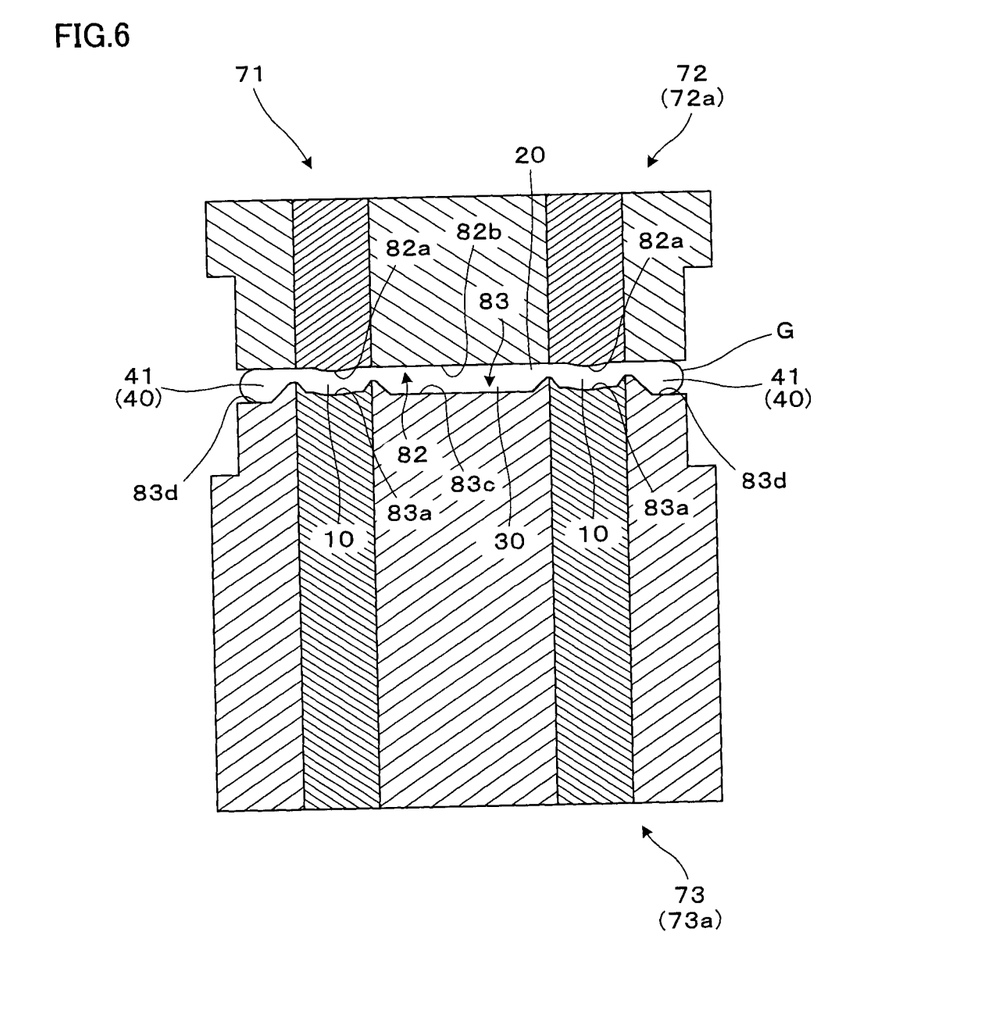
FIG. 6 is a side cross-sectional view for conceptually explaining a manufacturing process of a glass lens using the lower die and an upper die.

After the molten glass G is dropped and is spread on the die surface 83, during the time when the molten glass G is still at a temperature capable of pressure deformation, the lower die 73 is moved to below the upper die 72, the upper die 72 having been heated in advance to a temperature substantially equal to that of the lower die 73 is lowered as illustrated in FIG. 6, the upper die 72 and the lower die 73 are brought close to each other in a state where the die surface 82 and the die surface 83 are caused to face each other, and the molten glass G on the lower die 73 is subjected to pressure molding between the upper and lower dies 72 and 73 (molding process).

Since the temperature of the molten glass G gradually lowers from the dripping process to the molding process, the lens array 100 which is an integrated product made of glass including the plurality of lens portions 10, the support portion 20, the fitting portion 30, and the protruding portion 40 is molded. After performing mold release and taking out a molded body (lens array 100), the process moves to the subsequent molding.

Hereinafter, a specific manufacturing example will be described. The die body 72a of the upper die 72 and the die body 73a of the lower die 73 are made of WC (tungsten carbide). A set temperature at the time of molding of the die body 72a and the die body 73a was set to 450° C., a molding pressure was set to 120 kgf/cm$^2$ (1.18×10$^7$ N/m$^2$), and pressing was performed for 5 seconds while a thickness of the molten glass G sandwiched between the upper and lower dies 72 and 73 is kept to be 0.45 mm. After the press, the dies were opened, and the molded body (lens array 100) was removed from the dies. Such molding cycle lasted for 20 seconds.

Hereinafter, a lens array laminate body obtained by assembling the lens array 100 and the like illustrated in FIG. 1 and the like as constituent elements will be described.

Figure 7A:
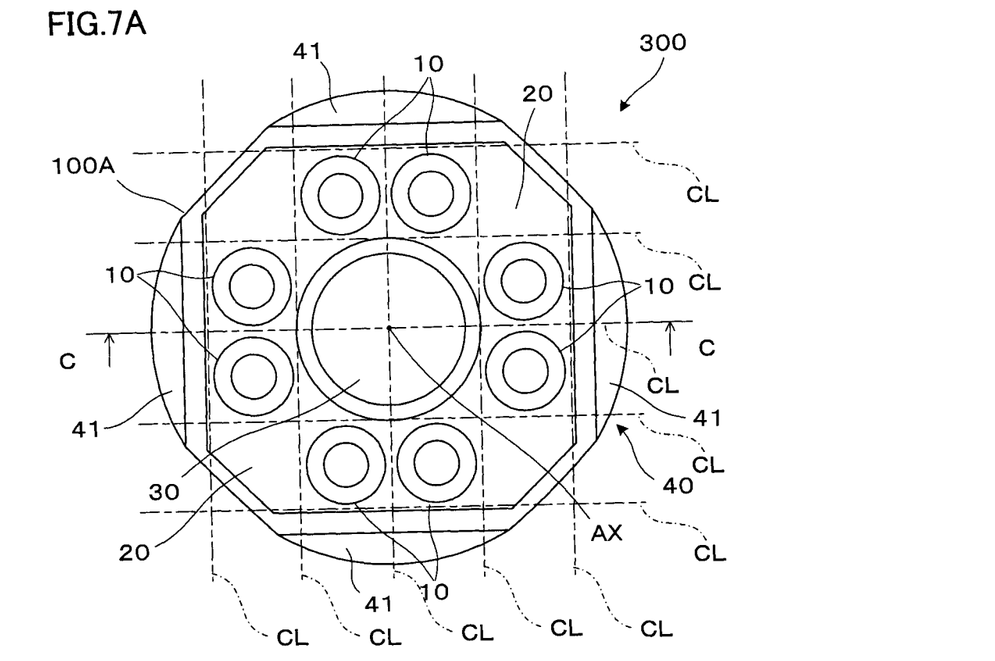
FIG. 7A is a plan view of a lens array laminate body.
Figure 7B:
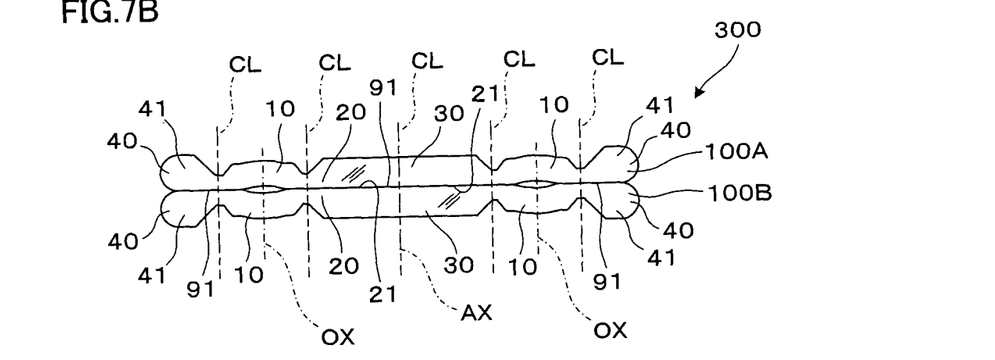
FIG. 7B is a CC arrow cross-sectional view of FIG. 7A.

As illustrated in FIGS. 7A and 7B, a lens array laminate body 300 includes a first lens array 100A, a second lens array 100B, and a joining layer 91. The first lens array 100A is similar to the lens array 100 illustrated in FIG. 1A and the like and includes the plurality of lens portions 10, the first support portion 20, the first fitting portion 30, and the first protruding portion 40. The second lens array 100B is similar to the first lens array 100A and includes the plurality of lens portions 10, the second support portion 20, the second fitting portion 30, and the second protruding portion 40. The joining layer 91 is sandwiched between the reference surface 21 provided on the first support portion 20 of the first lens array 100A and the reference surface 21 provided on the second support portion 20 of the second lens array 100B, and plays a role of joining them.

Figure 7C:
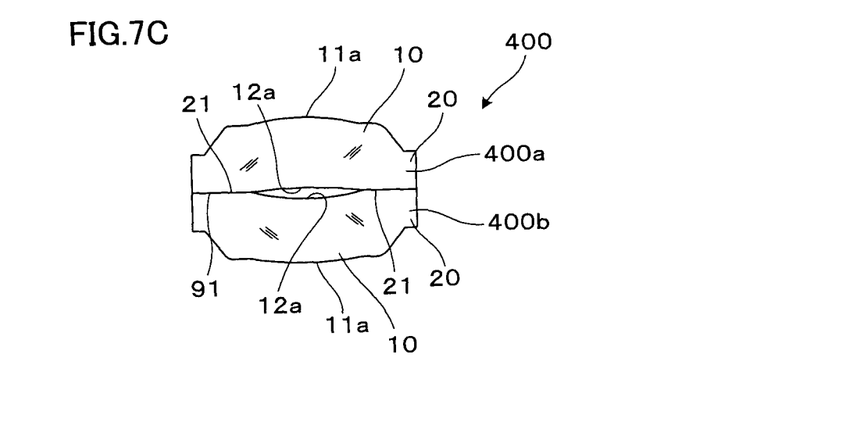
FIG. 7C is a cross-sectional view of a glass lens unit cut out of the lens array laminate body in FIG. 7A.

A glass lens unit 400 illustrated in FIG. 7C is a unit divided into individual pieces by dicing the lens array laminate body 300 illustrated in FIGS. 7A and 7B along cutting lines CL (lines in parallel with the axis AX direction) set vertically and laterally at equal intervals. The glass lens unit 400 has a first lens 400a and a second lens 400b, which are joined via the joining layer 91. The first lens 400a is mainly constituted by the lens portion 10 of the first lens array 100A and has the first support portion 20 having a rectangular shape in a plan view in the periphery as a portion remaining after the dicing. The second lens 400b is mainly constituted by the lens portion 10 of the second lens array 100B and has the second support portion 20 having a rectangular shape in a plan view in the periphery as a portion remaining after the dicing. Note that, as is also obvious from the figures, the fitting portions 30 of the lens arrays 100A and 100B are removed so as not to remain in the end product.

Figure 8:
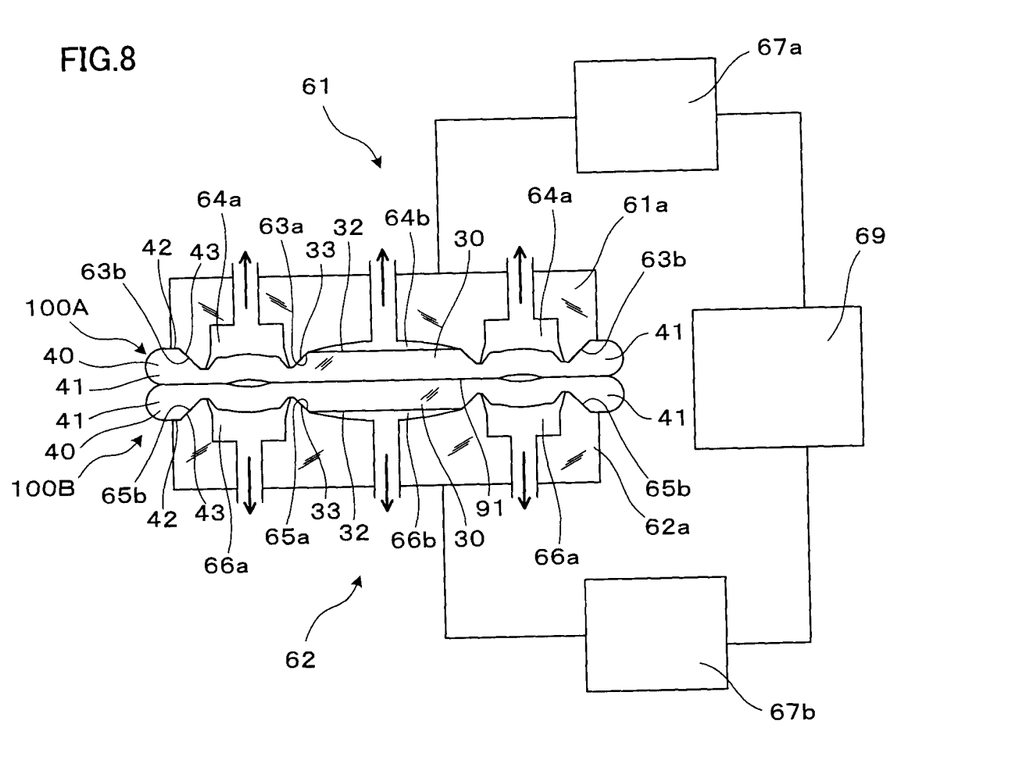
FIG. 8 is a side cross-sectional view for conceptually explaining a process for manufacturing a lens array laminate body by bonding a pair of lens arrays.

FIG. 8 is a view for explaining a process for making the lens array laminate body 300. The first lens array 100A illustrated in FIG. 7B and the like is fixed in a state of being aligned to a first chuck member 61a of a first holding device 61 used for assembling. The second lens array 100B is fixed in a state of being aligned to a first chuck member 62a of a second holding device 62 used for assembling.

The first chuck member 61a has a first positioning portion 63a which is a concave portion fitted with the first fitting portion 30 of the first lens array 100A and a second positioning portion 63b which is a concave portion fitted with the first protruding portion 40 of the first lens array 100A. The first positioning portion 63a has a role of aligning the center position of the first lens array 100A, and the second positioning portion 63b has a role of aligning a rotating posture of the first lens array 100A. That is, the first positioning portion 63a performs centering or adjustment of a protruding amount of the first lens array 100A by being brought into contact with the flat portion 32 and the inclined surface portion 33 of the first fitting portion 30, and the second positioning portion 63b performs rotation regulation or adjustment of a protruding amount of the first lens array 100A by being brought into contact with the flat portion 42 and the inclined surface portion 43 of the first protruding portion 40. Note that a first suction portion 64a is a portion for suctioning the lens portion 10 and holding it in the first chuck member 61a, and a second suction portion 64b is a portion for suctioning the first fitting portion 30 and holding it in the first chuck member 61a. The second suction portion 64b can be omitted.

The second chuck member 62a has a first positioning portion 65a which is a concave portion fitted with the second fitting portion 30 of the second lens array 100B and a second positioning portion 65b which is a concave portion fitted with the second protruding portion 40 of the second lens array 100B. The first positioning portion 65a has a role of aligning the center position of the second lens array 100B. The second positioning portion 65b has a role of aligning the rotating posture of the second lens array 100B. That is, the first positioning portion 65a performs centering or adjustment of a protruding amount of the second lens array 100B by being brought into contact with the flat portion 32 and the inclined surface portion 33 of the first fitting portion 30. Furthermore, the second positioning portion 65b performs rotation regulation or adjustment of a protruding amount of the second lens array 100B by being brought into contact with the flat portion 42 and the inclined surface portion 43 of the second protruding portion 40. Note that a first suction portion 66a is a portion for suctioning the lens portion 10 and holding it in the second chuck member 62a. Moreover, a second suction portion 66b is a portion for suctioning the second fitting portion 30 and holding it in the second chuck member 62a.

The first chuck member 61a is three-dimensionally movable by being driven by a first driving portion 67a and is capable of suctioning or releasing of the first lens array 100A by the suction portions 64a and 64b by being driven by the first driving portion 67a. That is, the first lens array 100A can be arranged at a desired posture and at a desired position by holding the first lens array 100A by the first chuck member 61a.

The second chuck member 62a is three-dimensionally movable by being driven by a second driving portion 67b and is capable of suctioning or releasing of the second lens array 100B by the suction portions 66a and 66b by being driven by the second driving portion 67b. That is, the second lens array 100B can be arranged at a desired posture and at a desired position by holding the second lens array 100B by the second chuck member 62a.

An operation will be briefly described. A control portion 69 controls operations of the first and second holding devices 61 and 62, has the first lens array 100A held by the first chuck member 61a of the first holding device 61 in a aligned state and has the second lens array 100B held by the second chuck member 62a of the second holding device 62 in a aligned state. After that, a photocurable adhesive is thinly applied at an appropriate place on the reference surface 21 of the second lens array 100B on the lower side, and the first lens array 100A is aligned and arranged above the second lens array 100B by operation of the first holding device 61, and the first lens array 100A is lowered and brought close to the second lens array 100B. At this time, the reference surface 21 of the first lens array 100A and the reference surface 21 of the second lens array 100B face each other by sandwiching the thin joining layer 91. After that, the joining layer 91 is cured by irradiating the joining layer 91 with light via the first and second chuck members 61a and 62a having light permeability, and the first and second lens arrays 100A and 100B are joined together. That is, the lens array laminate body 300 illustrated in FIG. 7A and the like is completed. After that, the lens array laminate body 300 can be taken out by releasing suctioning on the first lens array 100A side by the first holding device 61 and by raising the first chuck member 61a.

As described above, according to the lens array 100 according to the present embodiment, since the convex fitting portion 30 is provided between the plurality of lens portions 10 or more specifically, is provided on the center side surrounded by the plurality of lens portions 10 and protrudes from the support portion 20 on the side opposite to the reference surface 21 for joining provided at the support portion 20, the lens array 100 can be precisely positioned by being supported from behind in, for example, the assembling process for joining the lens array 100 to another lens array or the like. That is, since the lens array 100 can be positioned with respect to the holding device 61 used for assembling for joining the lens array to another component by the convex fitting portion 30, positioning in fixing the lens array 100 supported by the holding device 61 to another component becomes simple and accurate. Furthermore, since the fitting portion transfer surface 83c forming the convex fitting portion 30 forms a concave portion on the center side of the die at the time of molding the lens array 100, the volume of the glass droplet, that is, the heat capacity is increased, which is advantageous from a viewpoint of making molding of the optical surfaces 11a and 12a stable and highly precise, and problems such as breakage are less likely to occur.

Hereinbefore, the lens array and the like according to the present embodiment have been described, but the lens array and the like according to the present invention are not limited to the above.

Figure 9:
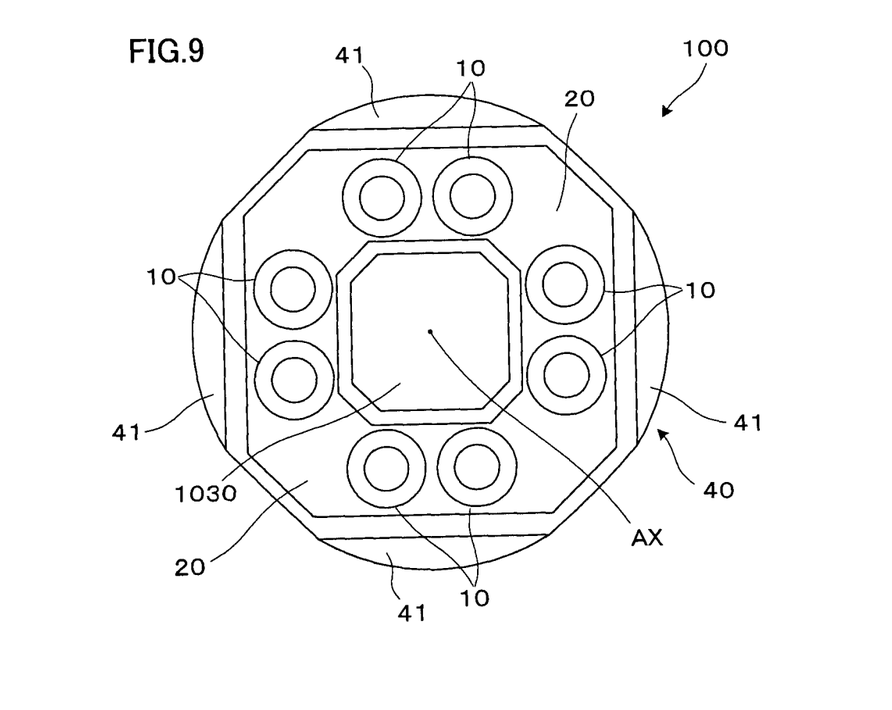
FIG. 9 is a plan view for explaining a lens array of a modification.

For example, the shape of the convex fitting portion 30 provided on the lens array 100 is not limited to be circular in a plan view and can be various shapes. FIG. 9 is a view for explaining the lens array 100 in a modification. In this case, a cross-section of a convex fitting portion 1030 is similar to that in FIG. 1B, but has an octagonal shape in a plan view. Not only the center position but also the rotating posture of the lens array 100 can be adjusted by providing such fitting portion 1030, and positioning by the inclined surface portion 43 or the like of the protruding portion 40 can be made unnecessary. Note that the fitting portion 1030 can have a rectangular shape close to a circle with rounded four corners, for example.

A target for positioning and joining the lens array 100 is not limited to other lens arrays of the same types but can be a lens array formed of materials other than glass (for example, plastic, a composite material (hybrid) in which materials of different kinds such as a glass substrate and a lens made of a resin are combined or the like), an optical member, a holder, a sensor or the like.

Furthermore, the fitting portion 30 and the protruding portion 40 can be used not only for positioning in assembling a product by joining the lens array 100 to another component, but also for being fixed to another jig or a lens array in cutting the lens array 100.

Moreover, another member, for example, a spacer can be interposed and a diaphragm ring or diaphragm rings arranged only in the periphery of the lens portion 10 or the lens portions can also be inserted, between the first lens array 100A and the second lens array 100B.

The lens array 100 can be manufactured by methods other than the droplet molding method. A method for supplying a glass material on the die surface 83 of the lower die 73, for example, is not limited to a method of dripping of a molten glass droplet but may be a method of having a molten glass continuously flow in. Moreover, plate-like or massive glass (preform) having a volume similar to that of the molten glass G to be dripped onto the die surface 83 of the lower die 73 can be heated and molten.

Moreover, in the above-described embodiment, the number of optical portion transfer surfaces 83a is not limited to 8 and may be 2 or more. That is, the number of lens portions 10 provided on the lens array 100 can be an arbitrary number of 2 or more. However, the larger number is more advantageous from a viewpoint of mass production.

Furthermore, in the above-described embodiment, the glass lens unit 400 is cut out into a rectangular shape, but the shape to be cut out is an exemplification and may be, for example, a circular shape.

The embodiment described above in which the die body 73a is separated into the core die 73g and the barrel die 73h has been exemplified, but the die body 73a can be an integral type in which the core die 73g is not provided.

The invention claimed is:

1. A lens array comprising:
a plurality of lens portions, each having an optical axis;
a support portion integrally connecting the plurality of lens portions in a state of being two-dimensionally aligned;
a reference surface for joining provided at the support portion; and
a convex fitting portion which is not optical and is surrounded by the plurality of lens portions on a side opposite to the reference surface to protrude from the support portion and which is specifically configured for positioning with respect to a non-mold holding device,
wherein the lens array is formed by receiving a droplet of melting glass in a die and performing pressing, and
wherein the reference surface is a plane having a normal vector parallel to each optical axis.

2. The lens array according to claim 1, wherein the fitting portion has a flat portion extending in a direction perpendicular to the optical axes of the lens portions and an inclined surface portion formed around the flat portion and inclined with respect to the optical axis of the lens portions.

3. The lens array according to claim 1, wherein a height of the fitting portion in a direction of the optical axes of the lens portions is larger than that of the lens portion.

4. The lens array according to claim 1, wherein the plurality of lens portions is arranged on lattice points, and the fitting portion has a circular contour.

5. The lens array according to claim 1, wherein the support portion has a polygonal contour.

6. The lens array according to claim 1, further comprising a protruding portion protruding toward an outside from at least a part of the contour of the support portion.

7. The lens array according to claim 1, wherein the protruding portion has a plurality of flat portions extending in a direction perpendicular to the optical axes of the lens portions and a plurality of inclined surface portions formed inside the plurality of flat portions and inclined with respect to the optical axes of the lens portions.

8. The lens array according to claim 1, wherein a height of the protruding portion in a direction parallel to the optical axes of the lens portions is larger than a height of the fitting portion.

9. The lens array according to claim 1, wherein distances from a center of the fitting portion to centers of the plurality of lens portions are equal to one another.

10. The lens array according to claim 1, wherein a ratio of a volume of the fitting portion to a total volume of the plurality of lens portions is 0.8 or more and 1.2 or less.

11. The lens array according to claim 1, wherein a ratio of an area in a plan view of the support portion to an area in a plan view of the support portion, except a portion corresponding to the fitting portion, is 1.2 or more and 1.5 or less.

12. A lens array laminate body including the lens array according to claim 1 as a first lens array; and a second lens array and formed by joining a reference surface of the first lens array to the second lens array.

13. A lens array laminate body manufacturing method, wherein the lens array laminate body is obtained by joining a reference surface of the lens array according to claim 1 as the first lens array to the second lens array.

14. A lens unit manufacturing method, wherein the lens array laminate body manufactured by the lens array laminate body manufacturing method according to claim 13 is divided into individual pieces by being cut in an axial direction.

15. A lens array manufacturing method, which comprises:
   supplying a droplet of melting glass to a first die including a plurality of first optical portion transfer surfaces corresponding to first optical surfaces of a plurality of lens portions, each of the plurality of first optical portion transfer surfaces having an optical axis, a first support portion transfer surface corresponding to a first surface of a support portion for integrally connecting the plurality of lens portions in a state of being two-dimensionally aligned, and a fitting portion transfer surface corresponding to a convex fitting portion which is non-optical and is surrounded by the plurality of lens portions on a side opposite to a reference surface for joining which is provided at the support portion to protrude from the support portion and which is configured for positioning with respect to a non-mold holding device, the reference surface being a plane having a normal vector parallel to each optical axis;
   interposing the droplet of melting glass between the first die and a second die including a plurality of second optical portion transfer surfaces corresponding to the second optical surfaces of the plurality of lens portions and a second support portion transfer surface corresponding to a second surface of the support portion; and
   transferring shapes of the first and second optical portion transfer surfaces, the first and second support portion transfer surfaces, and the fitting portion transfer surface by pressing the second die onto the first die, thereby molding a lens array.

* * * * *